United States Patent Office 3,247,194
Patented Apr. 19, 1966

3,247,194
PYRIMIDINE DYESTUFFS
Jakob Benz, Oberwil, Basel-Land, and Hans Ischer, Basel, Switzerland, assignors to Sandoz Ltd., Basel, Switzerland
No Drawing. Filed Nov. 28, 1962, Ser. No. 240,724
Claims priority, application Switzerland, Nov. 6, 1958, 65,868/58
3 Claims. (Cl. 260—242)

The present application is a continuation-in-part of our application Ser. No. 776,208 (abandoned since the filing of the present application), filed November 25, 1958 and relates to reactive water-soluble phthalocyanine dyestuffs of the formula

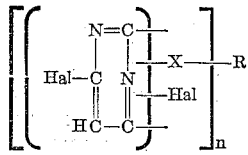  (I)

wherein:

Hal is a halogen having an atomic number from 17 to 35, inclusive, i.e. is chlorine or bromine,
R is the radical of a water-soluble phthalocyanine dyestuff,
X is a bridge containing an —O— directly bonded to a ring carbon atom of the pyrimidyl group, and
$n$ is a whole positive number of at most 2.

The bridge member X is preferably one of the following groups:

—SO₂—NH-(lower alkylene)-O—   —SO₂—N-(lower alkylene)-O—
                                    |
                                    lower alkyl /(lower alkylene)-O—
—SO₂—N-(lower alkylene)-O—   —SO₂—N
       |                            \
       (lower alkylene)-O—           (lower alkylene)-OH —SO₂—NH-phenylene-O—   —SO₂—NH-naphthylene-O— such as

—SO₂—NH—CH₂—CH₂—O—    —SO₂—NH—CH—CH₂—O—
                                  |
                                  CH₃

—SO₂—N—CH₂—CH₂—O—     —SO₂—N—CH₂—CH₂—O—
       |                       |
       CH₃                     C₂H₅

—SO₂—NH—CH₂—CH₂—CH₂—O—

—SO₂—N—CH₂—CH₂—CH₂—O—   —SO₂—N—CH₂—CH₂—O—
       |                         |
       CH₃                       CH₂—CH₂—O—

/CH₂—CH₂—O—
—SO₂—N
           \CH₂—CH₂—OH

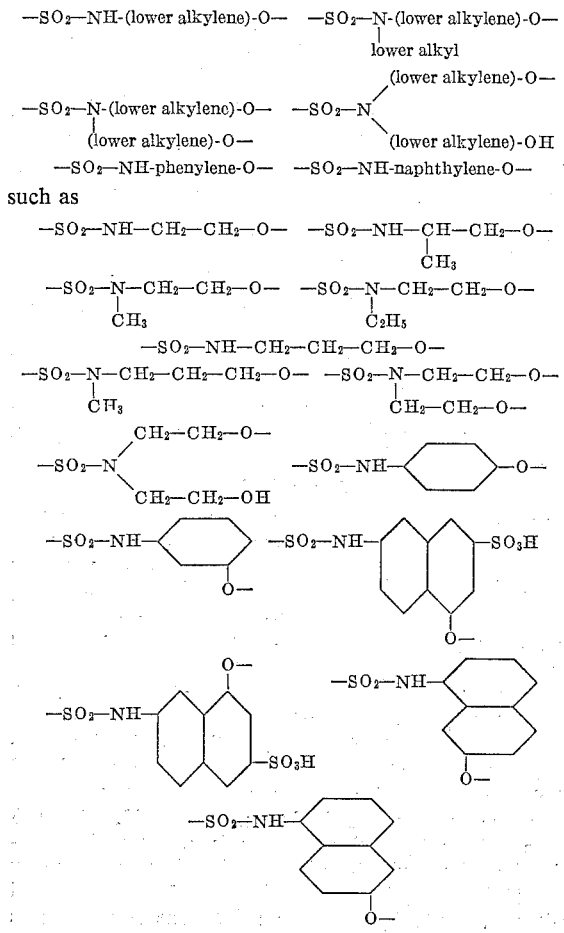

In these bridge members the phenylene nuclei can also contain one or two sulfonic acid groups, which are introduced into the dyestuff molecule after the condensation with 2,4,6-trihalopyrimidine, e.g.

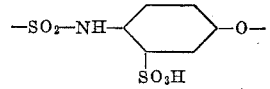

or

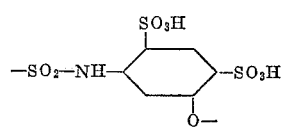

The radical R is the radical of a metal-free or metal-containing phthalocyanine, e.g. of cobalt-, nickel- or preferably copper-phthalocyanine, the said phthalocyanine radical bearing at least two and at most three sulfonic acid groups and/or sulfonic and amide groups, so that the total number of —SO₃H and/or —SO₂-NH₂ groups in the dyestuff molecule is at least 2 and at most 5.

The group

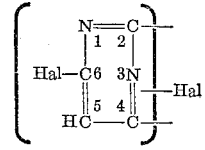

in Formula I means that the dihalopyrimidyl radical is a mixture of 2,6-dihalopyrimidyl-4- and 4,6-dihalopyrimidyl-2.

The process for the production of the new dyestuffs consists in reacting 1 mole of a phthalocyanine compound of the formula

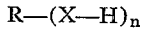

R—(X—H)$_n$ with $n$ moles of a 2,4,6-trihalopyrimidine, preferably 2,4,6-trichloropyrimidine.

An alternative process consists in condensing 1 mole of a hydroxy compound which also bears a primary or secondary amino group with 1 mole of 2,4,6-trihalopyrimidine and condensing the thus obtained amino-dihalopyrimidyloxy-compound with a phthalocyanine-polysulfonic acid chloride.

The dyestuffs and intermediate products used may of course contain a number of OH groups higher than the number $n$; in this case the surplus hydroxy groups do not participate in the reaction with the 2,4,6-trihalopyrimidine.

The reaction of the compounds or water-soluble dyestuffs used as starting products with 2,4,6-trihalopyrimidine is carried out preferably in aqueous medium. It can also be conducted in organic solvents or in mixtures of organic solvents and water; such media can be particularly effective for reacting poorly soluble or insoluble intermediate products.

The choice of organic solvents includes alcohols, ethers such as dioxane, ketones such as acetone, benzene, toluene, chlorobenzene etc. The 2,4,6-trihalopyrimidines can be employed as such in concentrated form or in solution in an organic solvent. Solvents especially suitable for the trihalopyrimidines are acetone, benzene, chlorobenzene and toluene.

The reaction temperature is adapted to the reactivity of the individual starting products and varies within wide limits. Preferably, temperatures between 0° and 100° C. are employed. If temperatures higher than about 40° C. must be maintained it is advisable in view of the volatility of the trihalopyrimidines in steam to work in vessels fitted with reflux condensers.

The reaction is carried out in a strongly to weakly alkaline, neutral or weakly acid medium. To neutralize the hydrogen halide formed an acid-binding agent, e.g. sodium or potassium carbonate, sodium hydroxide, potassium hydroxide, calcium hydroxide or barium hydroxide in solid powder form or as an aqueous solution is added to the solution either at the start or in the course of the reaction. The addition of small amounts of a wetting or emulsifying agent to the reaction mixture can accelerate the rate of reaction.

In both modes of operation of the process the reaction is conducted so that only one halogen atom of the 2,4,6-trihalopyrimidine reacts with an exchangeable hydrogen atom. For instance, the phthalocyanine dyestuffs containing $n$ aliphatically or aromatically bound hydroxy groups are condensed with the 2,4,6-trihalopyrimidine preferably in neutral or weakly acid medium, e.g., in the pH-region of 6-7 at temperatures above 60° C., e.g., at 80-100° C., while for the intermediate products, e.g., 3- or 4-amino-1-hydroxybenzene, the condensation is carried out at temperatures under 40° C., preferably at 0° to 25° C., in the presence of strong alkalis such as sodium or potassium hydroxide, so that an alkali metal phenolate is formed which reacts quickly with the 2,4,6-trihalopyrimidine, care being taken that the reaction medium reacts alkaline during the whole course of the condensation in order to minimize the condensation of the amino group.

On completion of condensation the final pyrimidine dyestuff is salted out from the previously neutralized solution or suspension with sodium or potassium chloride or precipitated with an acid, and subsequently filtered off, washed and dried.

The water-soluble dyestuffs produced in accordance with the present process, which contain at least one dihalopyrimidyl ring, are suitable for dyeing, padding and printing fibers of vegetable and animal origin, fibers of regenerated cellulose, casein fibers, animalized cellulosic fibers, synthetic fibers, mixtures of these fibers, and leather. The dyeings are subjected when necessary to an alkaline aftertreatment at moderate or high temperatures followed by soaping. They possess very good fastness to washing and good fastness to light, milling, perspiration, dry rubbing, dry cleaning (organic solvents), chlorinated swimming pool water and acetic acid. The new dyestuffs are also highly suitable for application by continuous and semi-continuous processes such as the Pad-Jig, Pad-Roll and Pad-Steam methods, and are fully resistant to heat-setting treatments.

The new dyestuffs with a dihalopyrimidyloxy group react more easily with polyamide fibers, e.g., wool, or cellulosic fibers, e.g., cotton, linen or regenerated cellulose, than the corresponding dyestuffs with a dihalopyrimidylamino group so that a greater amount of dyestuff remains fixed on the fiber even after the dyeing has been treated with pyridine (so-called pyridine test) or with a hot solution of a detergent.

The dyeings and prints produced with the new dyestuffs are of high quality, due primarily to the fact that the dyestuff enters into chemical combination with the substrate to form a stable chemical linkage and hence is as a rule extremely fast to wet treatments. If the total amount of applied dyestuff does not take part in the chemical reaction with the substrate, the unreacted proportion is removed by suitable aftertreatments such as washing and/or soaping, if necessary at high temperatures, for which purpose the normal washing agents can be used, e.g., alkylarylsulfonates, such as dodecylbenzenesulfonate, alkali metal higher alkylsulfates such as sodium laurylsulfate, optionally sulfated or carboxymethylated alkylpolyglycol ethers, mono- or diakylphenylpolyglycol ethers.

In dyeing, padding and printing applications the dyestuffs can be fixed simultaneously or subsequently, in the same or in a fresh bath, if necessary after intermediate drying. When fixation is carried out in a fresh bath it is advisable to include in it a water-soluble salt, e.g., sodium sulfate, to preclude a partial redissolving of the dyestuff in the liquor. The dyestuff radical is fixed on the fiber by heat treatment, i.e., under the conditions of heat setting.

The fixation process can, however, be markedly accelerated or the necessary fixation temperature reduced by adding to the dyebath or the aftertreating bath an agent of acid or alkaline reaction as catalyst.

The optimum conditions for laboratory-scale application of the dyestuffs vary widely depending on the type of fiber to be dyed. In the case of animal fibers and synthetic polyamide fibers it is preferable to dye, pad or print, or alternatively to fix, in an acid, neutral or weakly alkaline medium, e.g., in presence of acetic acid, formic acid, sulfuric acid, ammonium sulfate, lactic acid, oxalic acid, sodium acetate, sodium bicarbonate, sodium or potassium carbonate, sodium meta-phosphate trimethylamine, pyridine, quinoline, etc. Dyeing can also be carried out in an acetic acid to neutral bath in presence of levelling agents, e.g., polyoxethylated fatty amines or mixtures of the same with alkylpolyglycol ethers, the dyebath being adjusted on completion of dyeing to a neutral or weakly alkaline reaction, using for this purpose small amounts of an agent of alkaline reaction, e.g., ammonia, sodium bicarbonate or carbonate, etc., or compounds which react alkaline on heating, e.g., hexamethylenetetramine or urea. The dyed goods are then thoroughly washed and if necessary acidified with a little acetic acid.

Cellulosic fibers are dyed, padded and printed preferably from alkaline media, e.g., in presence of sodium bicarbonate, sodium carbonate, sodium hydroxide, potassium hydroxide, calcium hydroxide, sodium meta-silicate, sodium borate, water glass, trisodium phosphate, ammonia, trimethylamine, quaternary bases, e.g., tetraalkylammonium compounds, etc. To prevent reduction reactions during dyeing, padding or printing, it is often advantageous to use a mild oxidizing agent, e.g., sodium 1-nitrobenzene-3-sulfonate. Dyeings on cellulosic fibers are normally fixed by treatment in heat. Provided sufficiently strong alkalis such as sodium or potassium hydroxide or trisodium phosphate are used, a number of the dyestuffs can be applied by cold dyeing methods. After fixation the dyed, padded or printed material is thoroughly washed and soaped to remove the unfixed proportion of dyestuff.

The new dyestuffs reserve cellulose triacetate, polyester fibers, e.g., polyethylene terephthalate, polyvinyl chloride and polyvinyl acetate fibers, polyethylene and polypropylene fibers.

In the following examples the parts and percentages are by weight and the temperatures in degrees centigrade.

Example 1

57.6 parts of copper phthalocyanine are entered into 300 parts of chlorosulfonic acid and stirred for 1 hour at 140°. After cooling to 70–80° 45 parts of thionyl chloride are slowly dropped in and stirring is continued for 2 hours at 75–80°, then the mass is poured onto ice. The precipitated tetrasulfonic acid chloride is filtered off and washed with weakly acidified ice-water. The filter-cake is stirred into 500 parts of ice water. 11 parts of 3-amino-1-hydroxybenzene are added and the mixture neutralized with dilute sodium hydroxide solution. 60 parts of sodium bicarbonate are added and stirring continued for 12 hours at room temperature. Then the temperature is increased to 70°. After 5 hours sodium hydroxide solution is added until everything has dissolved. The intermediate is precipitated by the addition of hydrochloric acid, filtered off and washed well with dilute hydrochloric acid. The filter cake is stirred into 800 parts of water and neutralized by the addition of sodium hydroxide solution. To this solution is added at 85–90°, 18.5 parts of 2,4,6-trichloropyrimidine. For 12 hours the solution is stirred vigorously at 85–90°, the pH value being kept between 6 and 7 with dilute sodium hydroxide solution. Then a further 18.5 parts of 2,4,6-trichloropyrimidine are added and the reaction allowed to continue for 12 hours under the same conditions.

A fabric of viscose rayon staple fiber is printed on a roller printing machine with a paste composed of:

30 parts of the dyestuff of Example 1,
100 parts of urea,
405 parts of water,
450 parts of sodium alginate thickening 4% and
15 parts of sodium bicarbonate 1000 parts total.

The print is dried, steamed for 5–10 minutes at about 102°, rinsed thoroughly in cold water, soaped at the boil for 10 minutes, rinsed with water and dried. The brilliant turquoise print shows outstanding fastness to wet treatments and very good light fastness.

Similarly good results are obtained when the print, instead of being steamed, is treated in dry heat for 5 minutes at 120–150°.

When in the above example the condensation of the 3-amino-1-hydroxybenzene with the tetrasulfonic acid chloride is carried out in the presence of ammonia, the $-SO_2-Cl$ groups are partly or completely transformed into $-SO_2-NH_2$ groups.

*Example 2*

A moist filtercake of copper phthalocyanine tetrasulfonic acid chloride, produced with 57.6 parts of copper phthalocyanine according to Example 1, are stirred into 500 parts of ice-water. 18 parts of 2-hydroxyethylamine and 60 parts of sodium bicarbonate are added. The mixture is stirred for 12 hours at room temperature and then slowly heated to 70°. The intermediate is precipitated with hydrochloric acid. The filtercake is stirred into 800 parts of water and neutralized with sodium hydroxide solution. Condensation with 37 parts 2,4,6-trichlorpyrimidine is carried out at 85–90° and in the pH-range of 6 to 7 as described in Example 1.

A dark blue powder is obtained which dissolves in water with a turquoise blue coloration and dyes cotton in turquoise shades fast to light and to wet treatments.

*Example 3*

The procedure described in Example 1 is followed but the copper phthalocyanine-3,3′,3″,3‴-tetrasulfonic acid chloride is replaced by copper phthalocyanine-4,4′,4″,4‴-tetrasulfonic acid chloride, obtained from 90 parts of copper phthalocyanine-4,4′,4″,4‴-tetrasulfonic acid by heating with chlorosulfonic acid and thionyl chloride. The thus produced dye has excellent fastness properties to light and wet treatments.

100 parts of cotton sateen are padded at room temperature in 1000 parts of a 3% neutral solution of the dyestuff obtained as described above, and squeezed to give an increase of 100% to 150% on the dry weight. After drying it is treated in an open jigger in a developing bath containing 10 grams per liter of sodium carbonate and 240 grams per liter of Glauber's salt for 15–30 minutes at 80–90°. The fabric is subsequently rinsed well with cold water, soaped for 10 minutes at the boil in a bath containing 3 grams per liter of soap and 2 grams per liter of sodium carbonate, rinsed again with water and dried. The turquoise dyeing produced in this way is outstandingly fast to wet treatments and has good light fastness.

*Example 4*

109 parts of 3-amino-1-hydroxybenzene are dissolved at room temperature in 1000 parts of water and 150 parts of a 30% sodium hydroxide solution and the solution cooled to 0°. Then a solution of 200 parts of 2,4,6-trichloropyrimidine in 200 parts of acetone is added dropwise in the course of about 50 minutes under vigorous stirring, the temperature being held at 0–5° by external cooling. During the addition the condensation product 3-amino-1-dichloropyrimidyloxy-benzene separates as a heavy liquid. When all trichloropyrimidine has been dropped in, stirring is continued for about 10–15 minutes whereupon the reaction mixture is allowed to stand at 0–5° for about 30 minutes. The condensation product is separated from the aqueous solution by decantation and poured into 2000 parts of a 1 N hydrochloric acid solution at room temperature. The hydrochloride which crystallizes out is filtered off and washed with dilute hydrochloric acid.

An amount of the moist hydrochloride corresponding to 25.6 parts of 3-amino-1-dichloropyrimidyloxy-benzene is stirred with 200 parts of water and the suspension added at 0–5° to a well stirred suspension of a moist paste of copper phthalcoyanine-tetrasulfonic acid chloride (obtained from 57.6 parts of copper phthalocyanine according to the details of Example 1) in 800 parts of water. Then the suspension is neutralized with 30% sodium hydroxide solution, the temperature being maintained below 10°. 30 parts of sodium bicarbonate are added and stirring is continued for about 20 hours at room temperature i.e. until the condensation is completed. Then a sodium hydroxide solution is added to bring the pH-value to 11 and stirring is continued at room temperature and a pH-value of about 11 until all the $-SO_2Cl$ groups have been transformed into $-SO_3Na$ groups, i.e. until a sample is entirely soluble in cold distilled water. The reaction mass is then neutralized with hydrochloric acid and the dye precipitated with sodium chloride, filtered off, washed with sodium chloride solution and dried. The dark dye powder obtained dissolves in water with a turquoise shade and dyes wool from an acid dyebath and cellulosic fibers by a padding technique in turquoise shades fast to light and to wet treatments.

2 parts of of the dried dyestuff are dissolved in 4000 parts of water. The solution is heated to 40° and 2 parts of 100% acetic acid are added. 100 parts of a wool fabric are introduced into this bath, which is then brought to the boil in 15–20 minutes and maintained at boiling temperature for 45–60 minutes. After cooling to 85–90°, about 3 parts of 25% ammonia or 3 parts of hexamethylenetetramine are added and the treatment is continued for 20 minutes at 90°. The dyed goods are subsequently rinsed with a little acetic acid added to one of the rinsing waters, and then dried. The wool is dyed in a level, turquoise shade of very good fastness to washing, perspiration and milling and good light fastness.

*Example 5*

57.6 parts of copper phthalocyanine are sulfochlorinated for 5 hours at 117–119° with 300 parts of chlorosulfonic acid, then the reaction mass is cooled to 75–80° and further treated with thionyl chloride according to the details of Example 1. The obtained copper phthalocyanine-3,3′,3″-trisulfonic acid chloride is further reacted as described in Example 1. The so produced dye is somewhat less soluble than the dye of Example 1 but is very suitable for the exhaustion dyeing process.

A dyebath is prepared with 2 parts of the above dyestuff, 1500 parts of water and 15 parts of sodium chloride. 100 parts of cotton sateen are introduced into the bath at room temperature and dyed at 20–25° for 30–45 minutes, during which time a further 100–150 parts of sodium chloride are added to the dyebath in portions. Subsequently 3–5 parts of sodium hydroxide are added and dyeing continued for 30–45 minutes at the same temperature. The dyed goods are then rinsed with cold water, soaped at the boil for 10–20 minutes, rinsed again and dried. A brilliant turquoise dyeing is obtained which is outstandingly fast to wet treatments and of good light fastness.

Example 6

51.3 parts of metal-free phthalocyanine are heated for 5 hours at about 120° with 300 parts of chlorosulfonic acid and then treated with thionyl chloride at about 80° according to the details of Example 1. The phthalocyanine-3,3′,3″,3‴-tetrasulfonic acid chloride is transformed into dyes according to the procedures described in Exampels 1 or 4. The dyes yield dyeings with excellent wet fastness properties and good fastness to light.

The formulae of the dyestuffs of Examples 1 to 6 are as follows:

Examples 1 and 4

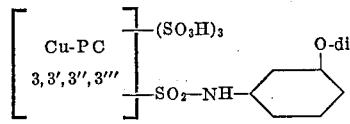

wherein dichloropyrimidyl denotes a mixture of 2,6-dichloropyrimidyl-4- and 4,6-dichloropyrimidyl-2.

Example 2

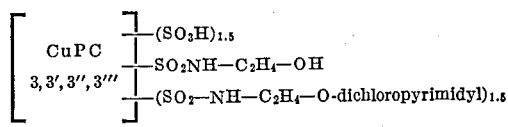

Example 3

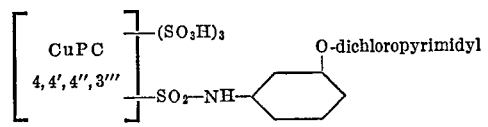

Example 5

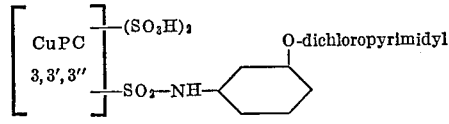

Example 6

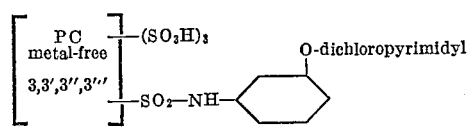

In the following table further water-soluble phthalocyanine dyestuffs with a dihalo-pyrimidyl-oxy group are represented by their formulae. In this table—

PC represents the metal-free phthalocyanine radical,
NiPC represents the nickel phthalocyanine radical,
CuPC represents the copper phthalocyanine radical,
A represents a 2,6-dichloropyrimidyl-4-oxy- or a 4,6-dichloro-pyrimidyl-2-oxy group,
B represents a 2,6-dibromopyrimidyl-4-oxy or a 4,6-dibromopyrimidyl-2-oxy group, and
3,3′,3″,3‴ or 4,4′,4″,4‴ indicate the positions of the phthalocyanine at which the substituents are attached.

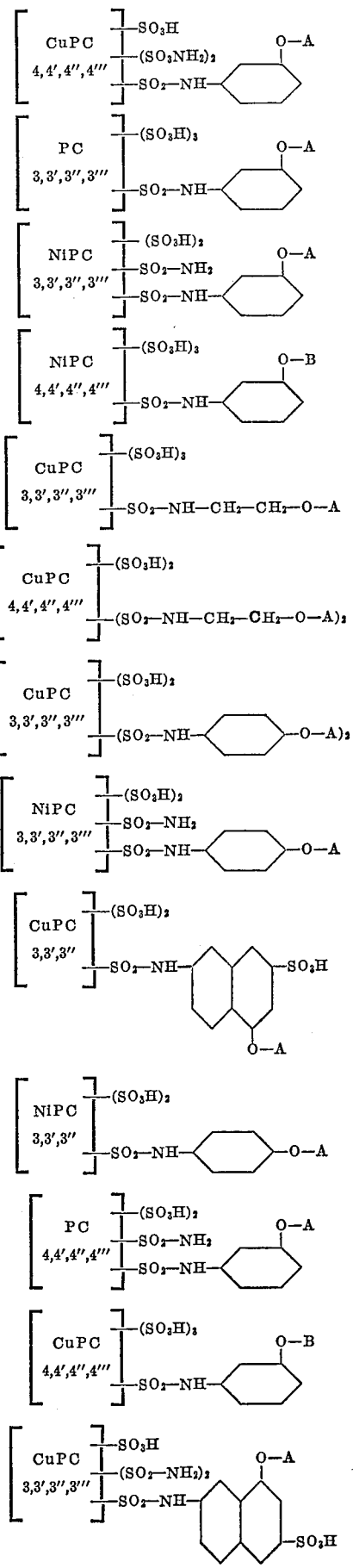

23. 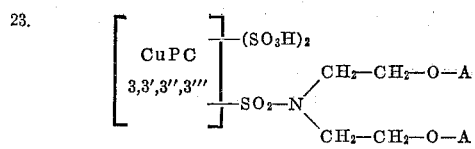

24. 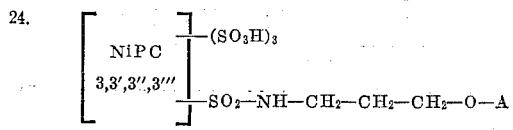

25. 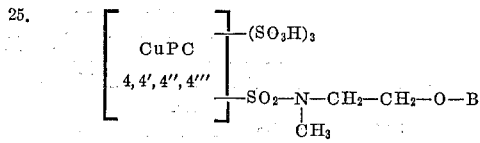

26. 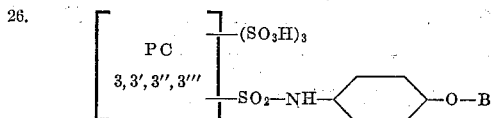

27. 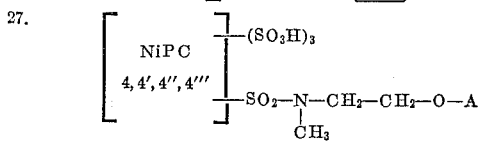

28. 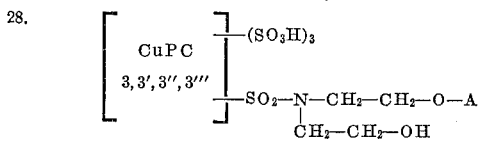

29. 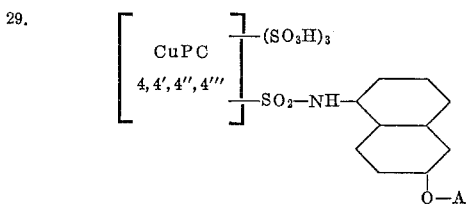

30. 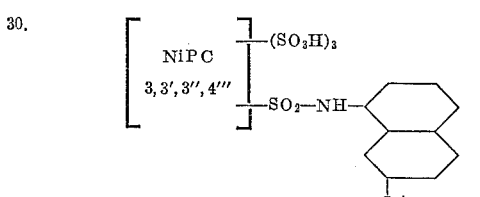

31. 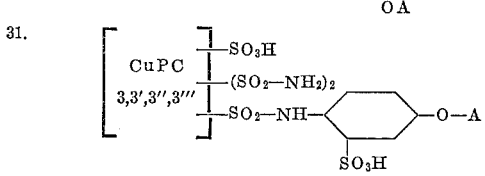

32. 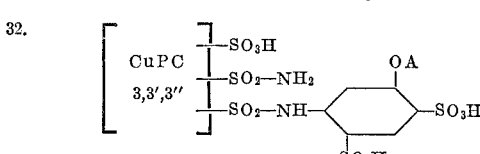

33. 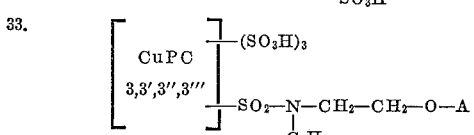

34. 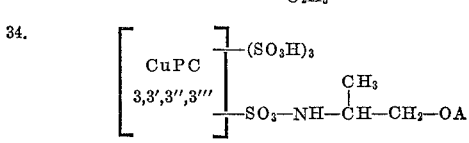

35. 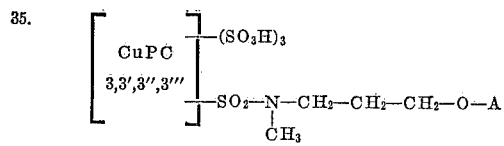

36. 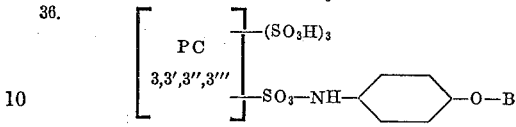

37. 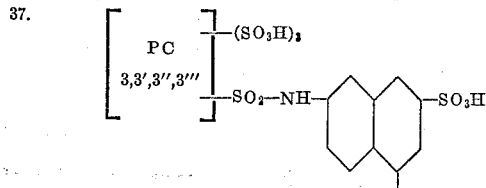

SHADES OF THE AQUEOUS SOLUTIONS

| No. of example: | Shade |
|---|---|
| 7 | Turquoise blue. |
| 8 | Do. |
| 9 | Do. |
| 10 | Reddish turquoise blue. |
| 11 | Turquoise blue. |
| 12 | Greenish turquoise blue. |
| 13 | Turquoise blue. |
| 14 | Do. |
| 15 | Reddish turquoise blue. |
| 16 | Turquoise blue. |
| 17 | Greenish turquoise blue. |
| 18 | Turquoise blue. |
| 19 | Greenish turquoise blue. |
| 20 | Reddish turquoise blue. |
| 21 | Do. |
| 22 | Turquoise blue. |
| 23 | Do. |
| 24 | Greenish turquoise blue. |
| 25 | Reddish turquoise blue. |
| 26 | Turquoise blue. |
| 27 | Do. |
| 28 | Do. |
| 29 | Reddish turquoise blue. |
| 30 | Greenish turquoise blue. |
| 31 | Turquoise blue. |
| 32 | Do. |
| 33 | Do. |
| 34 | Do. |
| 35 | Do. |
| 36 | Do. |
| 37 | Do. |

Having thus disclosed the invention what we claim is:

1. The water-soluble phthalocyanine dyestuff of the formula

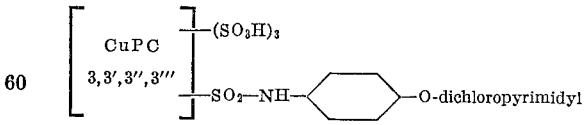

wherein:

[CuPC] stands for copper phthalocyaninyl,
dichloropyrimidyl denotes a mixture of 2,6-dichloropyrimidyl-4 and 4,6-dichloropyrimidyl-2, and
3,3′,3″,3′″ indicate the positions at which the 4 substituents are attached.

2. The water-soluble phthalocyanine dyestuff of the formula

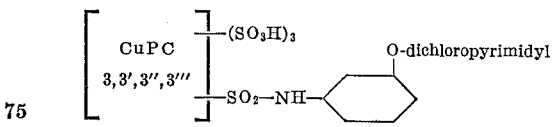

wherein:

[CuPC] stands for copper phthalocyaninyl,
dichloropyrimidyl denotes a mixture of 2,6-dichloropyrimidyl-4 and 4,6-dichloropyrimidyl-2, and
3,3',3'',3''' indicate the positions at which the 4 substituents are attached.

3. Water-soluble phthalocyanine dyestuff of the formula

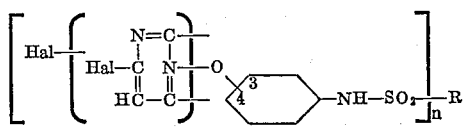

wherein:

Hal is a halogen having an atomic number from 17 to 35, inclusive;

R is a member selected from the group consisting of metal-free phthalocyaninyl, nickel phthalocyaninyl and copper phthalocyaninyl, R bearing as sole substituents two to three water-solubilizing substituents selected from the group consisting of —SO₃H and —SO₂NH₂, $n$ is a whole positive number of at most 2, and —O— is in one of the positions 3 and 4 of the phenylene nucleus.

References Cited by the Examiner

UNITED STATES PATENTS

| | | | |
|---|---|---|---|
| 1,760,076 | 5/1930 | Miner | 8—12 |
| 1,886,480 | 11/1932 | Haller et al. | 260—153 |
| 2,683,643 | 7/1954 | Baumann et al. | 8—1 |
| 2,741,534 | 4/1956 | Pedersen | 8—54.2 |
| 2,872,277 | 2/1959 | Kirk | 8—12 |
| 2,883,380 | 4/1959 | Persch et al. | 260—242 |
| 2,935,506 | 5/1960 | Heslop et al. | 260—154 |
| 3,035,058 | 5/1962 | Guenthard | 260—256.5 |
| 3,120,507 | 2/1964 | Andrew et al. | 260—146 |

NICHOLAS S. RIZZO, *Primary Examiner.*

DUVAL T. McCUTCHEN, *Examiner.*